Patented Apr. 23, 1940

2,197,862

UNITED STATES PATENT OFFICE 2,197,862

PROCESS FOR POLYMERIZING UNSATURATED GASES

Julius Hyman, Chicago, Ill., assignor to Velsicol Corporation, Chicago, Ill., a corporation of Illinois No Drawing. Application March 21, 1938, Serial No. 197,198

9 Claims. (Cl. 196—10)

This application is a continuation-in-part of my copending application Serial No. 81,685, filed May 25, 1936, Patent No. 2,137,492, issued November 22, 1938.

This invention relates to the preparation of synthetic alumino-silicates and their use in the polymerization of unsaturated hydrocarbon refinery gases.

It has recently been shown (Gray, United States Patent No. 2,034,575; Gayer, United States Patent No. 2,068,016; Frey, United States Patent No. 2,079,935) that certain treated or untreated natural materials of the fuller's earth type, and certain synthetic granular materials, will polymerize unsaturated constitutents of petroleum refinery cracked gases under suitable conditions. Such polymers either boil within the gasoline boiling range, or are heavier oils, depending upon the consistency of the gas, the activity of the catalyst, and the time and temperature of the reaction. These conditions are discussed in the patents previously referred to. The catalysts heretofore used, however, possessed very moderate activities, were crumbly and of low physical strength.

I have found that synthetic porous aluminosilicate adsorbent catalysts can be prepared which not only are decidedly superior in catalytic polymerizing activity to any natural or synthetic granular earthy catalyst heretofore used, but which are also very much more resistant to abrasion and rough handling.

These alumino-silicates are prepared by the interaction of dilute solutions of sodium silicate with dilute sodium aluminate solutions. The gels resulting from this interaction are freed of moisture by evaporation, or a combination of pressure and evaporation. After the gels have dried, they may be crushed to the desired screening size, and then washed with water until substantially free from occluded alkali and/or salts. The aluminosilicates contain "exchangeable" zeolitic sodium ion, which may be removed by very weak acid, or replaced by aluminium or ammonium ion. This exchange is best effected by repeatedly washing the gel with a fairly concentrated (e. g., 3%) solution of an aluminium or ammonium salt, and washing away the excess solution with water. When dried, the acid or aluminium-treated gel is ready to serve as a catalyst; the ammonium gel must first be heated to break down the ammonium complex and drive off the liberated ammonia before it will function as a catalyst. A gel which reacts alkaline when pulverized in water will not function as a catalyst for the polymerization herein contemplated.

As active catalysts, only those synthetic silicates are useable whose porosity is sufficient to permit entrance of the unsaturated hydrocarbons and egress of the polymers. This porosity is reflected in the apparent density of the catalyst, the lower the apparent density the greater being the porosity. The apparent density of the alumino-silicate should be less than 60, it being here defined as the weight of a cubic foot of unpacked material which is dry to the touch and has a screen size between 8 and 80 mesh, over 50% of which being of a screen size between 30 and 60 mesh. The atomic ratio of aluminium to silicon should lie between equality and one aluminium to twenty silicon for most satisfactory results from a standpoint of catalytic activity combined with physical strength.

The synthetic alumino-silicates herein described can be prepared to show more than double the catalytic activity of the best siliceous catalysts heretofore employed for polymerizing unsaturated gases, particularly monoolefines such as propylene and the butylenes. This activity manifests itself in lowering the time and/or temperature required for a given catalytic reaction to proceed. An active synthetic alumino-silicate, for example, will polymerize approximately 55% of the butylene fraction of a refinery gas, containing approximately 70% unsaturates, in 15 minutes at a temperature of 400° F. and a pressure of 350–450 lbs. per square inch, about 65% of the polymer boiling in the gasoline range. The polymerization tends toward the production of heavier polymers with longer contact times and with higher temperatures and pressures. Reducing these factors decreases the average molecular weight of the resulting polymers. Certain gaseous constituents, such as iso-butylene, are more easily polymerized than other unsaturates; and, if desired, the iso-butylene may be polymerized alone by reducing the contact time (and/or temperature and/or pressure) of the gases with (and) the catalyst. It will therefore be understood that I may use varying times of contact, pressures of 100 lbs. per square inch and upwards, and temperature ranges of 200° to 600° F.

Polymerization may also be carried out in liquid phase by dissolving the gases in a naphtha or an oil which is liquid at the temperature and pressure at which polymerization is conducted, and contacting the mixture with the catalyst. Liquid phase polymerization of olefines, however, is one of the subjects of my patent application Serial No. 174,656.

Small quantities of reactive diolefines present in the gases produce resinous substances on the catalyst, gradually reducing the activity of the latter. Synthetic alumino-silicates herein discussed, when thus fouled, may, for example, be reactivated by ignition at 1100°–1300° F. in the presence of air. The dark resin is burned practically completely away from the catalyst. With proper temperature regulation a synthetic alumino-silicate of the type whose use is herein contemplated may be reactivated indefinitely. (Certain oxidizing chemicals, such as hydrogen peroxide, also serve as excellent reactivating agents at temperatures of around 200° F.) This is in sharp contrast to other siliceous catalysts whose use has heretofore been proposed; the natural catalysts rapidly lose their activity on repeated calcinings, whereas the only other synthetic siliceous material heretofore described (Gayer, Ind. & Eng. Chem., 25, 1123 (1933)) is completely inactivated by ignition.

The synthetic alumino silicate catalysts herein described are much more resistant toward mechanical shock and abrasion than are the natural siliceous catalysts. Hence their useful life is much greater.

Because of their augmented properties of activity, hardness and reactivation, the catalysts whose use is herein contemplated are decidedly superior to any siliceous catalyst used heretofore.

I claim as my invention:

1. In the polymerizing treatment of hydrocarbon gases containing monoolefines, the step which comprises subjecting said gases to the action of a catalyst comprising a synthetic adsorbent alumino-silicate gel which has been freed of replaceable alkali ion and which has been calcined in air at about 1100° to 1300° F.

2. In the polymerizing treatment of unsaturated hydrocarbon gases, the step which comprises subjecting said gases to the action of a catalyst comprising a synthetic adsorbent alumino-silicate gel which has been freed of replaceable alkali ion and which has been calcined in air at about 1100° to 1300° F.

3. In the polymerizing treatment of unsaturated hydrocarbon gases the step which comprises subjecting said gases at elevated temperatures and pressures for limited periods of time to the action of a catalyst comprising a synthetic adsorbent alumino-silicate gel which has been freed of replaceable alkali ion and which has been calcined in air at about 1100 to 1300° F.

4. In the polymerizing treatment of unsaturated hydrocarbon gases comprising propylene and the butylenes, the step which comprises subjecting said gases at elevated temperatures and pressures for limited periods of time to the action of a catalyst comprising a synthetic adsorbent alumino-silicate gel which has been freed of replaceable alkali ion and which has been calcined in air at about 1100 to 1300° F.

5. In the polymerizing treatment of unsaturated hydrocarbon gases, the step which comprises subjecting said gases to the action of a porous, adsorbent, synthetic alumino-silicate gel which has been freed of its exchangeable sodium ion, at pressures of 100 lbs. per square inch and upwards and at a temperature of from 200 to 600° F., said gel having been calcined in air at about 1100 to 1300° F.

6. In the polymerizing treatment of unsaturated hydrocarbon gases, the step which comprises subjecting said gases to the action of an adsorbent moisture freed synthetic alumino-silicate gel which has been freed of replaceable alkali ion and which has been calcined in air at about 1100 to 1300° F., the atomic ratio of the aluminum to the silicon thereof being between equality and one aluminum to twenty silicon.

7. In the polymerizing treatment of unsaturated hydrocarbon gases containing monoolefines, the step which comprises subjecting said gases to the action of an adsorbent moisture freed synthetic alumino-silicate gel which has been freed of replaceable alkali ion and which has been calcined in air at about 1100 to 1300° F., the porosity thereof being sufficient to permit entrance of the said unsaturated hydrocarbons and egress therefrom of resulting polymers.

8. In the polymerizing treatment of unsaturated hydrocarbon gas fractions comprising propylene and the butylenes, the step which comprises subjecting said gases at elevated temperatures and pressures for limited periods of time to the action of an adsorbent moisture freed synthetic alumino-silicate gel which has been freed of replaceable alkali ion and which has been calcined in air at about 1100 to 1300° F.

9. In the polymerizing treatment of unsaturated hydrocarbon gases comprising propylene and the butylenes, the step which comprises subjecting said gases to the action of a porous, adsorbent, synthetic alumino-silicate gel which has been freed of its exchangeable sodium ion, at temperatures on the order of 200 to 600° F. and at pressures in excess of 100 lbs. per square inch, said gel having been calcined in air at about 1100 to 1300° F.

JULIUS HYMAN.